(12) United States Patent
Kawatoko et al.

(10) Patent No.: US 9,121,734 B2
(45) Date of Patent: Sep. 1, 2015

(54) PHOTOELECTRIC ABSOLUTE ENCODER HAVING A LIGHT RECEIVING ELEMENT ARRAY ADDITIONALLY ARRANGED CORRESPONDING TO A BOUNDARY BETWEEN THE TRACK HAVING A WIDE PITCH PATTERN AND A NARROW PITCH PATTERN AND INSTALLATION METHOD THEREFOR

(71) Applicant: MITUTOYO CORPORATION, Kawasaki-shi, Kanagawa (JP)

(72) Inventors: Osamu Kawatoko, Kawasaki (JP); Hirokazu Kobayashi, Kawasaki (JP)

(73) Assignee: MITUTOYO CORPORATION, Kawasaki-Shi (JP)

( * ) Notice: Subject to any disclaimer, the term of this patent is extended or adjusted under 35 U.S.C. 154(b) by 147 days.

(21) Appl. No.: 14/093,744

(22) Filed: Dec. 2, 2013

(65) Prior Publication Data
US 2014/0151539 A1    Jun. 5, 2014

(30) Foreign Application Priority Data
Dec. 4, 2012    (JP) .................................. 2012-265802

(51) Int. Cl.
*G01D 5/34* (2006.01)
*G01D 5/347* (2006.01)
*G01D 5/244* (2006.01)

(52) U.S. Cl.
CPC ........ *G01D 5/34715* (2013.01); *G01D 5/24485* (2013.01); *G01D 5/34792* (2013.01)

(58) Field of Classification Search
CPC .......... G01D 5/34715; G01D 5/34792; G01D 5/2455; G01D 4/34746; G11B 21/10; H03M 2201/2122
USPC .......... 250/231.13, 231.18, 239, 221, 559.26; 341/11, 13
See application file for complete search history.

(56) References Cited

U.S. PATENT DOCUMENTS

| 3,678,220 | A |   | 7/1972  | Luhrs |
| 4,758,720 | A |   | 7/1988  | Aubele et al. |
| 5,563,408 | A | * | 10/1996 | Matsumoto et al. ..... 250/231.14 |

FOREIGN PATENT DOCUMENTS

| JP | 07-324948    | 12/1995 |
| JP | 2008-064498  | 3/2008  |
| JP | 2011-237231  | 11/2011 |

OTHER PUBLICATIONS

European Search Report dated Jul. 21, 2014, 7 pages.

*Primary Examiner* — Que T Le
(74) *Attorney, Agent, or Firm* — Rankin, Hill & Clark LLP

(57) ABSTRACT

In a photoelectric absolute encoder including a scale having a plurality of tracks with different pitch patterns, and a detector having a light source and light receiving elements including a plurality of light receiving element arrays corresponding to the plurality of tracks, a light receiving element array is additionally arranged at a position in the detector corresponding to a boundary between the track having a pattern with a wide pitch and the track having a pattern with a narrow pitch adjacent to each other in the scale, and displacement of the detector relative to the scale in a lateral direction is detected from a signal amplitude of the added light receiving element array. In this manner, displacement of the detector relative to the scale in the lateral direction can be detected.

6 Claims, 6 Drawing Sheets

Fig.1       PRIOR ART
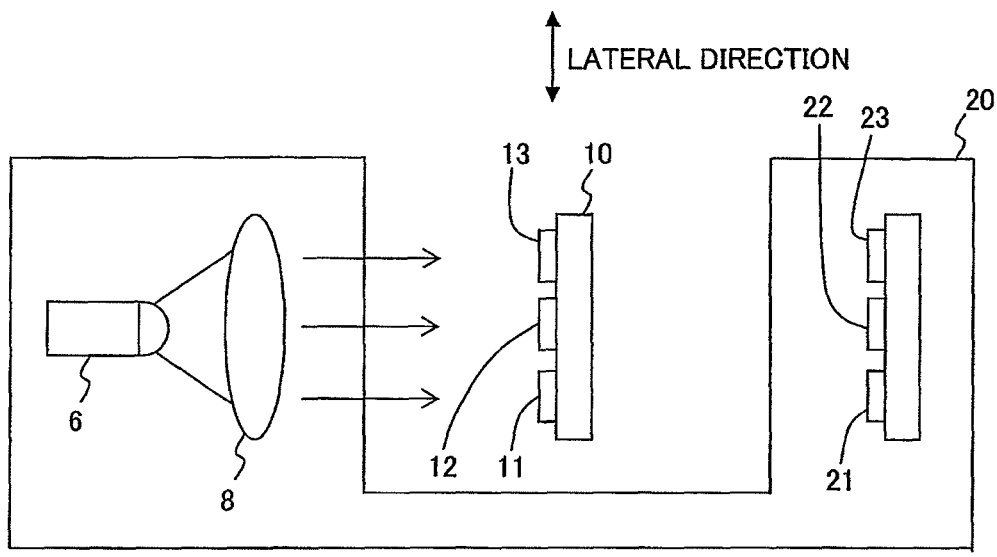

←——→ LATERAL DIRECTION

DETECTOR
(LIGHT RECEIVING
ELEMENT PORTION)

SCALE

LATERAL OFFSET
AMOUNT AND SIGNAL
AMPLITUDE

DETECTOR
(LIGHT RECEIVING
ELEMENT PORTION)

SCALE

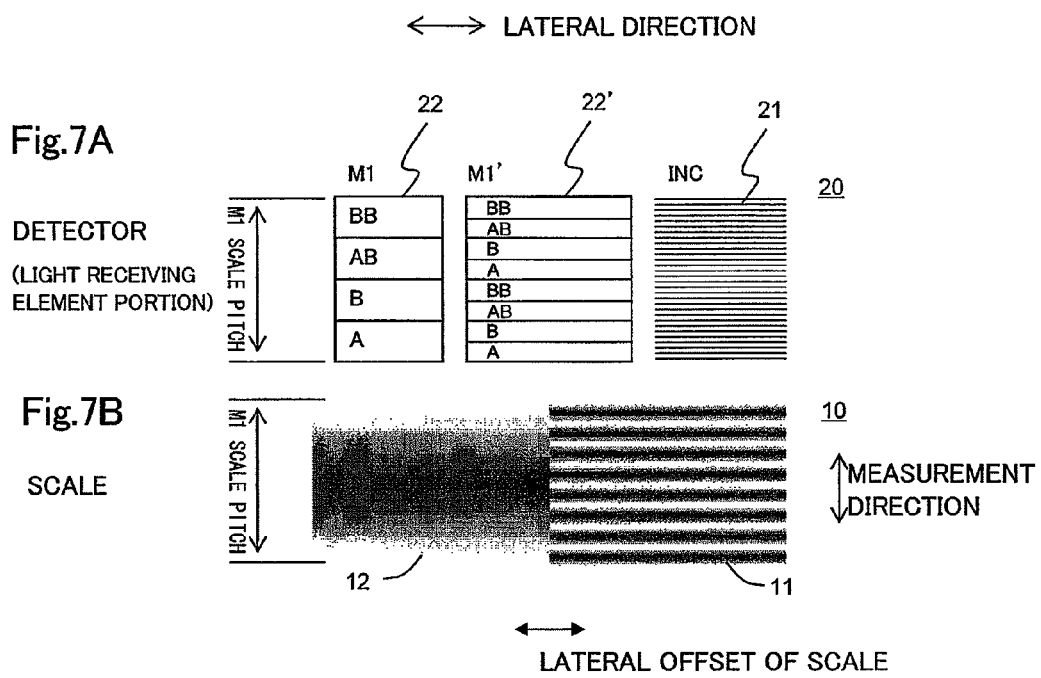

PHOTOELECTRIC ABSOLUTE ENCODER HAVING A LIGHT RECEIVING ELEMENT ARRAY ADDITIONALLY ARRANGED CORRESPONDING TO A BOUNDARY BETWEEN THE TRACK HAVING A WIDE PITCH PATTERN AND A NARROW PITCH PATTERN AND INSTALLATION METHOD THEREFOR

CROSS-REFERENCE TO RELATED APPLICATION

The disclosure of Japanese Patent Application No. 2012-265802 filed on Dec. 4, 2012 including specifications, drawings and claims is incorporated herein by reference in its entirety.

TECHNICAL FIELD

The present invention relates to a photoelectric absolute encoder and an installation method therefor. In particular, the present invention relates to a photoelectric absolute encoder suitable for use in a separate type photoelectric absolute encoder including a scale and a detector provided separately and a linear gauge, a digital indicator, or the like and capable of readily achieving positional alignment between a scale and a detector, and an installation method therefor.

BACKGROUND ART

Types of a position encoder include an incremental type with which only relative displacement is detected and an absolute type with which an absolute position is detected. Of these, the incremental type photoelectric position encoder has no detection ability on positional displacement in a lateral direction perpendicular to a pitch direction (measurement direction). Thus, there was no need to control an offset in the lateral direction (i.e., an amount of positional displacement between a scale and a light receiving element in the lateral direction perpendicular to a relative movement direction of the scale and a detector for detecting positions) upon the assembly thereof.

As a position encoder used in a machine tool or the like for a feedback purpose, on the other hand, the absolute type position encoder capable of detecting an absolute position when a power is turned ON is typically employed (such an encoder is referred to as an "absolute encoder"). The absolute encoder includes two or more tracks in the lateral direction perpendicular to the measurement direction. Thus, displacement in the lateral direction generates signal crosstalk. As a result, an acceptable range of absolute position synthesis is reduced. This leads to a reduction in the reliability of absolute position synthesis. As a result, an absolute position cannot be detected. It is therefore necessary to adjust the positional relationship between the scale and the detector in an accurate manner.

A transmissive type photoelectric position encoder, in particular, includes: a light source 6 having a collimator lens 8, for example; a scale 10 having three rows of tracks 11, 12, and 13, for example; and a detector 20 having three light receiving elements 21, 22, and 23, for example, corresponding to the tracks 11, 12, and 13, respectively, as illustrated in FIG. 1 as an example. Since these components are aligned on the same optical axis, it is difficult to visually perform positional alignment between the scale 10 and the light receiving elements 21, 22, and 23.

In a case of an absolute encoder having a three-track configuration, for example, a scale 10 (FIG. 2B) includes an incremental track 11 (referred to as an "INC track"), an absolute narrow pitch track 12 (referred to as an "M1 track"), and an absolute wide pitch track 13 (referred to as an "M2 track") and a detector 20 (FIG. 2A) includes light receiving element arrays 21 to 23 corresponding to the tracks 11 to 13, respectively, as shown in FIGS. 2A and 2B. In FIG. 2A, reference numerals 31 to 33 denote amplifiers; reference numeral 40 denotes a signal processor for performing analog-digital conversion and/or position calculation; reference numeral 42 denotes a counter device; and reference numeral 44 denotes a display device.

In order to detect a position appropriately with the configuration as shown in FIGS. 2A and 2B, it is required that the tracks 11 to 13 in the scale 10 and the light receiving element arrays 21 to 23 in the detector 20 be faced each other in a correct state as shown in FIG. 3. In contrast, if the positional relationship between the scale 10 and the detector 20 is misaligned, for example, in a lateral direction (in an upper direction in FIG. 4) as illustrated in FIG. 4 as an example, the light receiving element arrays 21 to 23 cannot detect a correct position.

According to the conventional position encoder, however, the light receiving element arrays 21 to 23 for obtaining main signals have no detection ability about displacement in the lateral direction. The conventional position encoder therefore cannot detect a lateral offset.

In view of the above, particularly in the separate type position encoder having the scale and the detector provided separately, means as will be described below have been proposed in order to set a positional relationship between the scale and the detector in a correct manner when installed in a device. For example, the machining accuracy of an installation surface of the detector is increased or an error due to the yawing of the detector relative to the scale is corrected after detecting a difference due to the yawing of the detector among readings from the light receiving element arrays provided for the respective tracks in order to detect positions as described in Patent Literature 1.

Moreover, the applicant proposes in Patent Literature 2 that a coil for yawing detection is provided also on the scale side in order to detect the yawing direction of the detector and correct measured values.

Furthermore, the applicant proposes in Patent Literature 3 that a displacement amount in the lateral direction is detected by providing a line sensor in the lateral direction.

CITATION LIST

Patent Literature

Patent Literature 1: Japanese Patent Application Laid-Open No. Hei. 7-324948
Patent Literature 2: Japanese Patent Application Laid-Open No. 2008-64498
Patent Literature 3: Japanese Patent Application Laid-Open No. 2011-237231

SUMMARY OF INVENTION

Technical Problem

However, such an improvement in the machining accuracy of the installation surface of the detector cannot facilitate the installation adjustment thereof. It is therefore necessary to mechanically set the detector at its optimum position while observing signals detected by the tracks. Thus, such installation adjustment is a troublesome task since whether it is in the correct state or not is unknown or to which direction the detector should be displaced is unknown.

An object in each of the techniques of Patent Literatures 1 and 2 is that even if a positional relationship (angle) of the detector is changed, correction is made on the detector side and a need to adjust the positional relationship in a precise manner is thereby eliminated. Thus, neither technique is intended to facilitate installation adjustment. Further, an error due to the yawing of the detector relative to the scale may be corrected. However, this cannot correct an error due to displacement in the lateral direction.

Also, the technique described in Patent Literature 2 has a problem such that another coil for yawing detection, which is different from the coil for position detection, needs to be provided also on the scale side.

Also, the technique described in Patent Literature 3 has a problem such that a separate line sensor needs to be provided in the lateral direction.

Solution to Problem

The present invention has been made in order to solve the above-described problems in the conventional technique, and an object thereof is to readily comprehend a relative positional relationship between a scale and a detector and thereby facilitate installation adjustment.

The present invention provides a photoelectric absolute encoder having the following configuration to solve the above-described problems. Specifically, in a photoelectric absolute encoder including a scale having a plurality of tracks with different pitch patterns, and a detector having a light source and light receiving elements including a plurality of light receiving element arrays corresponding to the plurality of tracks, a light receiving element array is additionally arranged at a position in the detector corresponding to a boundary between the track having a pattern with a wide pitch and the track having a pattern with a narrow pitch adjacent to each other in the scale, and displacement of the detector relative to the scale in a lateral direction is detected from a signal amplitude of the added light receiving element array.

A pitch of the added light receiving element array may correspond to the wide pitch in the scale.

Moreover, the added light receiving element array may include four photodiodes for four phases arranged within one pitch of the scale.

Moreover, the added light receiving element array may include four photodiodes for four phases A, B, AB, and BB arranged within one pitch of the scale.

Moreover, the wide pitch may be made substantially smaller than the narrow pitch.

Moreover, the pattern with the narrow pitch may be used as an incremental pattern.

Moreover, according to the present invention, when installing the above-described photoelectric absolute encoder, a signal amplitude of the added light receiving element array is detected, and positional alignment between the scale and the detector is performed so as to correct displacement of the detector relative to the scale in the lateral direction that is detected from the signal amplitude.

Advantageous Effects of Invention

According to the present invention, a lateral offset amount can be checked during an assembly stage on the basis of a signal from the light receiving element array. It is therefore possible to readily comprehend the relative positional relationship. Thus, upon the assembly of the position encoder, the positions of the scale and the light receiving elements can be adjusted while observing a displacement signal in the lateral direction. It is therefore possible to readily perform installation adjustment and thereby improve a first-pass rate (a proportion of the number of non-defective products to the total number of products manufactured). Also in a case of a design such that positioning is realized solely on the basis of the accuracy of components without employing an adjustment mechanism, the present invention can be used during an inspection process, thereby making it possible to control the quality thereof.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein;

FIG. 1 is a side view schematically showing a configuration example of a transmissive type photoelectric encoder;

FIG. 7A is a plan view showing a configuration of a detector (light receiving element portion) according to a third embodiment of the present invention; and FIG. 7B is a plan view showing a configuration of a scale according to the third embodiment of the present invention.

DESCRIPTION OF EMBODIMENTS

Embodiments of the present invention will be described below in detail with reference to the drawings.

Figure 5A:
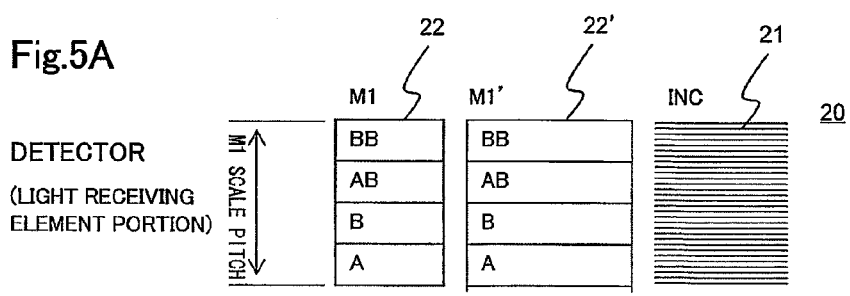
FIG. 5A is a plan view showing a configuration of a detector (light receiving element portion) according to a first embodiment of the present invention.
Figure 5B:
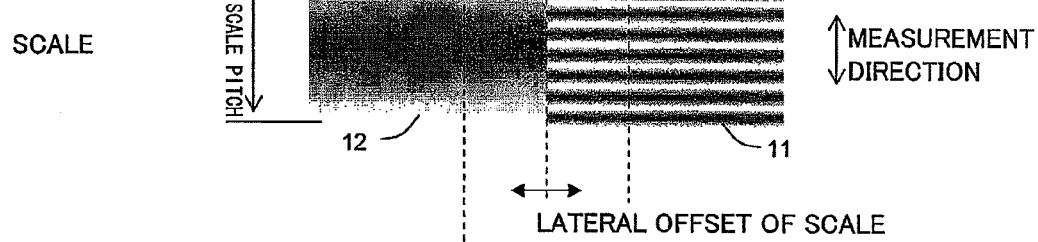
FIG. 5B is a plan view showing a configuration of a scale according to the first embodiment of the present invention.

A configuration of major parts according to the first embodiment is shown in FIGS. 5A and 5B.

Figure 2A:
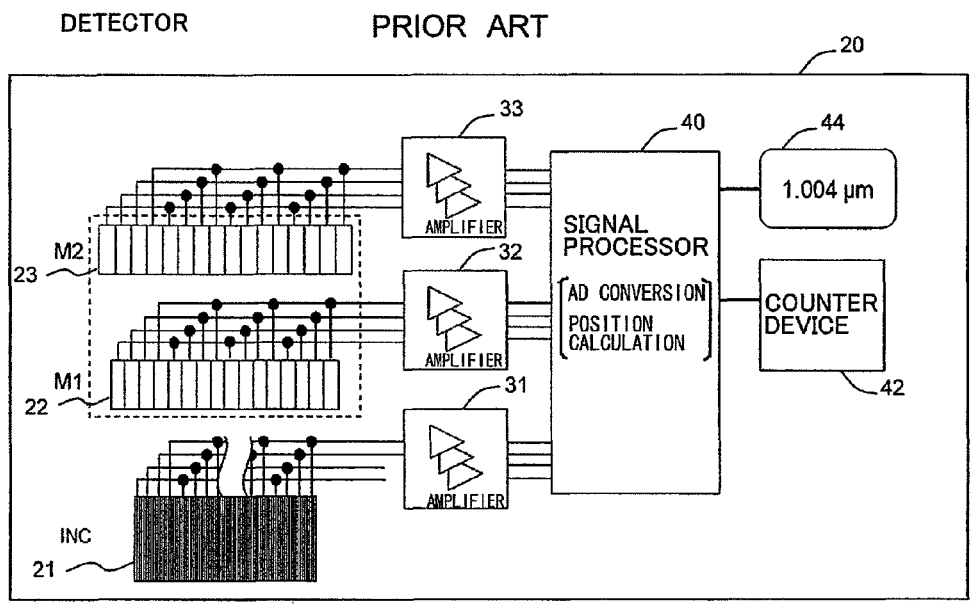
FIG. 2A is a plan view schematically showing a configuration of a detector in an absolute encoder having a three-track configuration.
Figure 2B:
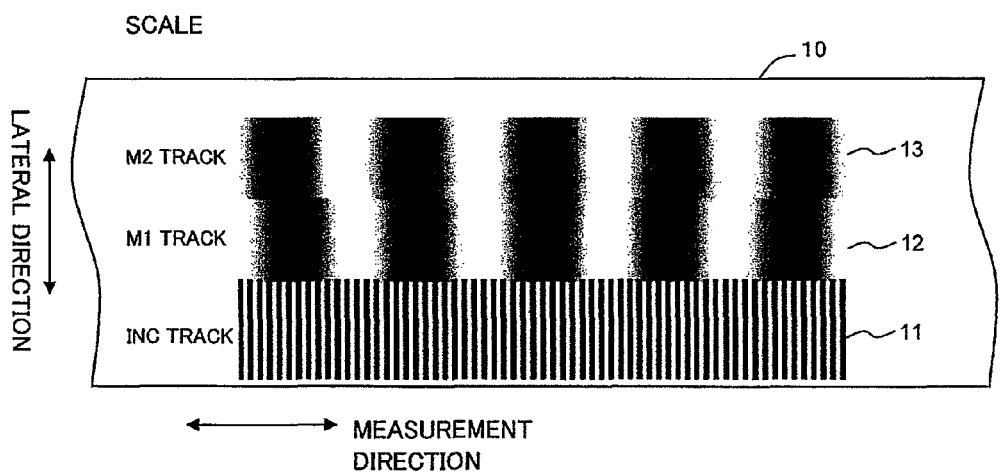
FIG. 2B is a plan view schematically showing a configuration of a scale in the absolute encoder having the three-track configuration.
Figure 3:
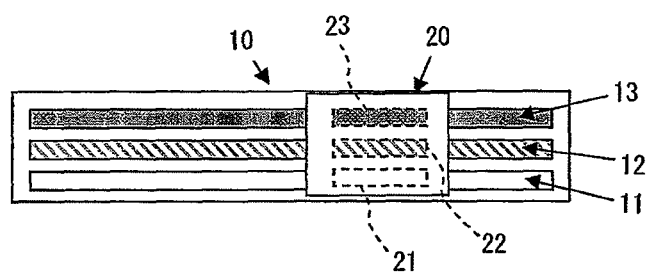
FIG. 3 is a plan view showing a state in which the detector is appropriately adjusted relative to the scale.
Figure 4:
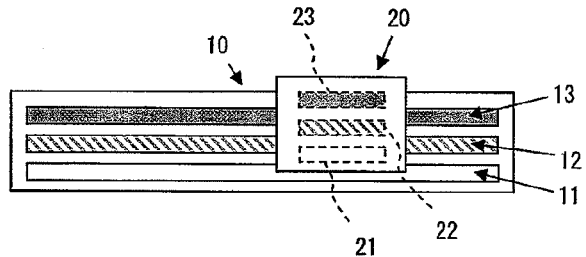
FIG. 4 is a plan view showing a state in which the position of the detector relative to the scale is displaced in a lateral direction.

FIGS. 5A and 5B show states obtained by rotating the states shown in FIGS. 2A and 2B by 90°. The longitudinal direction in these figures coincides with the measurement direction.

According to the present embodiment, a light receiving element array 22' having the same pitch as an M1 light receiving element array 22 is added as shown in FIGS. 5A and 5B at a position corresponding to a boundary between an INC track 11 and an M1 track 12 in a scale 10 and located between an INC light receiving element array 21 and the M1 light receiving element array 22 in a detector 20.

Specifically, four photodiodes (PD) A, B, AB, and BB for a phase A, a phase B, a phase AB, and a phase BB, respectively, are arranged within an M1 scale pitch, for example. Also, four photodiodes (PD) A, B, AB, and BB for the phase A, the phase B, the phase AB, and the phase BB, respectively, having the same pitch and the same size as the four photodiodes in the M1 light receiving element array 22 are arranged in the light receiving element array 22'.

An amplitude lamp of a signal I outputted from the added light receiving element array 22' is expressed by the following formula.

$$I_{amp} = \sqrt{(Ia-Iab)^2 + (Ib-Ibb)^2} \quad (1)$$

Herein, a photovoltaic current of the photodiode A is denoted by Ia; a photovoltaic current of the photodiode B is denoted by Ib; a photovoltaic current of the photodiode AB is denoted by Iab; and a photovoltaic current of the photodiode BB is denoted by Ibb.

Figure 5C:
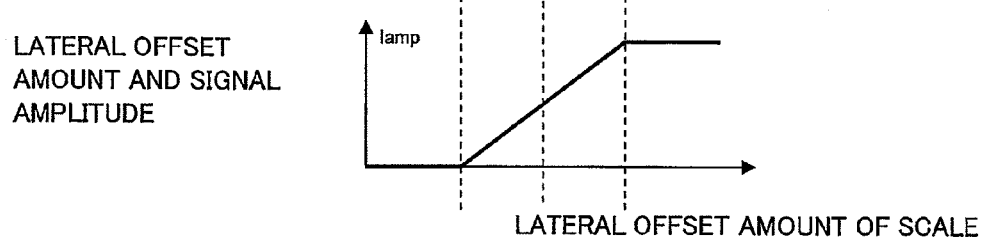
FIG. 5C is a graph showing an example of a relationship between a lateral offset amount and a signal amplitude.

Thus, by performing the amplitude calculations of these photodiodes, an M1' amplitude signal which changes in accordance with a lateral offset amount can be obtained as shown in FIG. 5C.

Here, the pitch of the INC track 11 is substantially smaller than that of the M1 track 12. Thus, almost all signals entering the PD with the M1 pitch are signals at direct current levels. It is therefore possible to find out displacement of the detector relative to the scale in the lateral direction from the output of the added light receiving element array as shown in FIG. 5C.

According to the present embodiment, the pitch of the added M1' light receiving element array 22' is set to be the same as the pitch of the adjacent M1 light receiving element array 22. Thus, it can be easily produced.

Figure 6A:
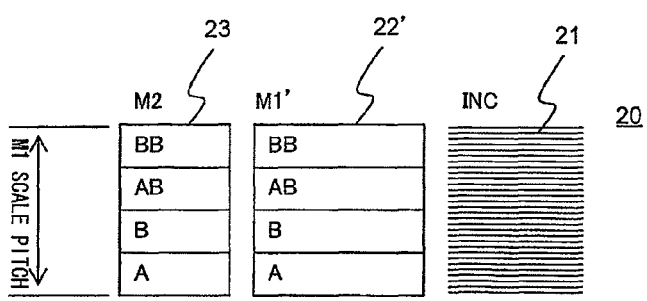
FIG. 6A is a plan view showing a configuration of a detector (light receiving element portion) according to a second embodiment of the present invention.
Figure 6B:
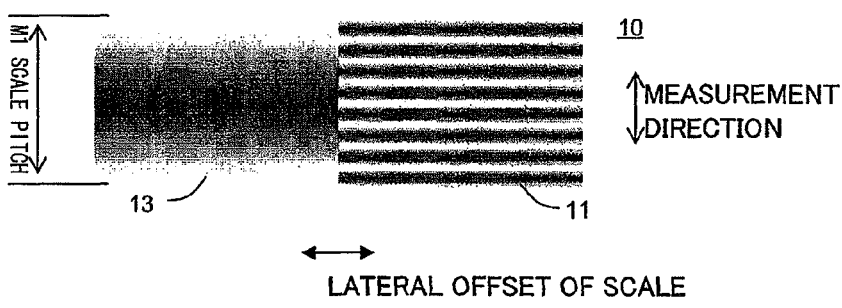
FIG. 6B is a plan view showing a configuration of a scale according to the second embodiment of the present invention.

The positions of the M1 track 12 and the M2 track 13 may be switched around and the pitch of the added light receiving element array 22' may be set to be the same as the pitch M2 of the M2 light receiving element array 23 as in the second embodiment shown in FIGS. 6A and 6B.

It is also possible to set the pitch of the added M1' light receiving element array 22' to be different from that of the adjacent light receiving element array as in the third embodiment shown in FIGS. 7A and 7B as long as that pitch is substantially larger than the pitch of the incremental track 11.

The elements making up the light receiving element array are not limited to the PDs.

In the embodiments described above, the present invention is applied to a linear absolute encoder. However, the application range of the present invention is not limited thereto. The present invention can be applied similarly to a circular encoder or a rotary encoder. The number of the tracks is not limited to three. Two or four or more tracks may be employed.

It should be apparent to those skilled in the art that the above-described exemplary embodiments are merely illustrative which represent the application of the principles of the present invention. Numerous and varied other arrangements can be readily devised by those skilled in the art without departing from the spirit and the scope of the invention.

The invention claimed is:

1. A photoelectric absolute encoder comprising:
   a scale having a plurality of tracks with different pitch patterns; and
   a detector having a light source and light receiving elements including a plurality of light receiving element arrays corresponding to the plurality of tracks, wherein
   a light receiving element array is additionally arranged at a position in the detector corresponding to a boundary between the track having a pattern with a wide pitch and the track having a pattern with a narrow pitch adjacent to each other in the scale, and
   displacement of the detector relative to the scale in a lateral direction is detected from a signal amplitude of the added light receiving element array.

2. The photoelectric absolute encoder according to claim 1, wherein a pitch of the added light receiving element array corresponds to the wide pitch in the scale.

3. The photoelectric absolute encoder according to claim 1, wherein the added light receiving element array includes four photodiodes for four phases arranged within one pitch of the scale.

4. The photoelectric absolute encoder according to claim 1, wherein the wide pitch is made substantially smaller than the narrow pitch.

5. The photoelectric absolute encoder according to claim 1, wherein the pattern with the narrow pitch is used as an incremental pattern.

6. A method for installing a photoelectric absolute encoder, the photoelectric absolute encoder including:
   a scale having a plurality of tracks with different pitch patterns; and
   a detector having a light source and light receiving elements including a plurality of light receiving element arrays corresponding to the plurality of tracks, wherein
   a light receiving element array is additionally arranged at a position in the detector corresponding to a boundary between the track having a pattern with a wide pitch and the track having a pattern with a narrow pitch adjacent to each other in the scale, and
   displacement of the detector relative to the scale in a lateral direction is detected from a signal amplitude of the added light receiving element array, the method comprising:
   detecting the signal amplitude of the added light receiving element array; and
   performing positional alignment between the scale and the detector so as to correct displacement of the detector relative to the scale in the lateral direction that is detected from the signal amplitude.

* * * * *